United States Patent Office 3,743,700
Patented July 3, 1973

3,743,700
PHOSPHORUS MANUFACTURE
Clyde P. Orr, St. Louis, Mo., assignor to Monsanto Company, St. Louis, Mo.
No Drawing. Filed May 13, 1971, Ser. No. 143,231
Int. Cl. C01b 25/02
U.S. Cl. 423—322          2 Claims

ABSTRACT OF THE DISCLOSURE

In electric furnace production of elemental phosphorus, mud is fed into a drying zone from which water is continuously removed at such a rate that the concentration of water in the drying zone is maintained at less than 8% by weight, the mud being admixed with sufficient phosphorus to provide a ratio of phosphorus to dirt in the drying zone of at least 75 to 25. The process produces a dry, fluid mud which is readily recycled to the electric furnace.

BACKGROUND OF THE INVENTION

Field of the invention

The present invention relates to an electric furnace process for manufacture of elemental phosphorus. In particular, the present invention relates to such a process wherein problems associated with by-product mud or sludge are alleviated.

As is well known to those skilled in the art, elemental phosphorus is commercially produced by charging phosphorus-containing ore in combination with silica and carbon (usually in the form of coke or charcoal) into an electric furnace. The furnace is brought to a temperature sufficient to melt the charge and thermally reduce the ore, the phosphorus being removed in the form of vapor. The phosphorus vapor carries with it fine particles of carbon, phosphate rock and other solid materials present in the furnace hereinafter collectively referred to as "dirt." In most commercial electric furnace operations, the phosphorus vapors containing the associated dirt are condensed and admixed with water. For example, the vapors may be introduced into a condensation chamber wherein they are sprayed with water. The condensate is then settled to form a bottom layer of product phosphorus, an intermediate layer of mud or sludge which is a tightly bound emulsion of phosphorus, water and dirt and a top layer of relatively clear water.

The mud or sludge basis commonly contains 15% or more phosphorus by weight. It is necessary to recover such phosphorus if the process is to be operated economically and without undue contamination of the environment.

Various techniques have been utilized to recover phosphorus from mud including centrifugation, filtration, extended settling, distillation, burning, chemical reactions and the like. Unfortunately, none of these techniques has proven completely satisfactory from economical or operational viewpoints.

SUMMARY OF THE INVENTION

Accordingly, it is an object of the present invention to provide improved processes for production of elemental phosphorus characterized by improved processing of mud. Basically, the improvement involves dehydration of the mud under critically controlled conditions of phosphorus and water content so as to maintain the fluidity of the mud and recycling the dehydrated mud to the phosphorus furnace.

The invention will be better understood from the following detailed description of the preferred embodiments.

DESCRIPTION OF THE PREFERRED EMBODIMENTS

The basic electric furnace process of which this invention is an improvement is old and well understood. The process is of the type in which phosphorus vapors are condensed and admixed with water so as to yield a condensate separable into phosphorus and mud phases by conventional settling techniques. Electric furnace processes of this type are described, for example, in Van Wazer, Phosphorus And Its Compounds, vol. II, Interscience publishers, 1961.

In the improved process of this invention, the mud is subjected to dehydration and thereafter recycled to the electric furnace. For the process of this invention to operate satisfactorily, certain critical parameters must be observed during the dehydration. The mud is maintained at a temperature at least sufficient to maintain the phosphorus therein in a molten state. The mud is then introduced into a drying zone maintained at a temperature of at least the boiling point of the water in the mud. Water vapor is continuously removed and vented from the drying zone as mud is introduced. The rate of water vapor removal from the drying zone and mud introduction to the drying zone is correlated so that the concentration of water in the drying zone is maintained at less than 8%, preferably less than 1% by weight. It is critical that the water concentration be controlled as described in order to prevent foaming or similar difficulties within the drying zone and in order that mud removed from the drying zone will have a sufficiently low water content so as not to adversely affect the electric furnace operation.

The continuous maintenance of a low water content is further critical to provide systems of sufficiently low viscosity to be handled by conventional pumping techniques. It is observed that when dehydrating mud on a batch basis, viscosity increases as water is removed until the mud is so viscous as to resist pumping as a liquid and to adhere to and reduce effectiveness of heat transfer surfaces. It would be expected, therefore, that further removal of water would intensify such undesired effects. However, as additional water is removed to provide a system having the water content specified a sharp decrease in viscosity unexpectedly occurs. It is believed that this is due to a change in the mud from an emulsion of phosphorus in a continuous water phase to an emulsion of water in a continuous phosphorus phase.

For the process of this invention to be practically operable, it is therefore essential to continuously control the concentration of water in the drying zone as specified above while simultaneously controlling the ratio of phosphorus to dirt as hereinafter described.

It is further critical that the ratio of phosphorus to dirt in the drying zone be maintained at least 75 to 25, preferably from about 86 to 14 to about 90 to 10 in order to permit materials transfer from the drying zone to be effected with conventional pumping apparatus. This ratio of phosphorus to dirt can be maintained by adding and admixing elemental phosphorus to the mud in or prior to introduction to the drying zone as required. If desired, the settling of the condensate from the electric furnace can be controlled to maintain the required ratio of phosphorus to dirt in the mud.

The dry mud is recycled to the electric furnace by conventional pumping apparatus. During the operation described, it is, of course, necessary to substantially exclude atmospheric oxygen from contact with dry phosphorus in accordance with conventional chemical practice.

Preferably, the drying zone is provided with conventional agitation means to prevent separation of the phosphorus from the dirt since separation would result in zones of high dirt content which are difficult, if not impossible, to handle. It is noted that one factor which has precluded the use of simple drying of mud with recycle of the dry product to the furnace as a technique of mud handling has been the difficulty inherent in the handling of dry mud of high dirt content.

The invention is further illustrated by the following example:

EXAMPLE I

Mud separated from the condensate of a conventional electric furnace process for production of elemental phosphorus and analyzing about 8.2% dirt, 48.3 water and 43.4% phosphorus and maintained at a temperature in excess of 46° C. was admixed with sufficient elemental phosphorus to provide a phosphorus to dirt ratio of about 90 to 10 and fed into a drying zone maintained at a temperature above the boiling point of water. The rate of mud introduction to the drying zone and water removal therefrom was such that the concentration of water in the drying zone was maintained at less than 2%. On a continuous operation basis, substantially all of the water in the mud was vaporized and removed from the drying zone immediately upon introduction of the mud thereto. The dry mud was pumped into the electric furnace with no adverse effect on furnace operating conditions.

What is claimed is:

1. In an electric furnace process for producing elemental phosphorus comprising (a) reducing the phosphorus containing ore in the electric furnace; (b) removing as an effluent from the furnace, phosphorus vapor and dirt; (c) condensing the phosphorus vapor and admixing the condensed phosphorus and dirt with water and (d) separating the condensate into phosphorus and mud layers; the improvement comprising introducing mud at a temperature at least sufficient to maintain the phosphorus therein in molten state into a heated drying zone maintained at a temperature of at least the boiling point of the water in the mud, the mud being admixed with sufficient phosphorus to provide a ratio of phosphorus to dirt of at least 75 to 25 in the drying zone; removing water vapor from the drying zone, the rate of water vapor removal from and mud introduction to the drying zone being correlated so that the concentration of water in the drying zone is maintained at less than 8% by weight; removing dry fluid mud containing less than 8% by weight water from the drying zone; and recycling the dry fluid mud to the electric furnace.

2. The process of claim 1 wherein the ratio of phosphorus to dirt in the drying zone is maintained from 86 to 14 to 90 to 10 and the concentration of water in the drying zone is maintained at less than 1% by weight.

References Cited

UNITED STATES PATENTS 2,289,277  7/1942  Ritter et al. _____ 23—223

EDWARD J. MEROS, Primary Examiner

G. ALVARO, Assistant Examiner

U.S. Cl. X.R.

75—10